(12) United States Patent
Suzuki et al.

(10) Patent No.: US 10,513,097 B2
(45) Date of Patent: Dec. 24, 2019

(54) DECORATIVE SHEET, DECORATIVE MOLDED ARTICLE, AND DECORATIVE MODULE

(71) Applicant: SEIREN CO., LTD., Fukui-shi, Fukui (JP)

(72) Inventors: Akihide Suzuki, Fukui (JP); Hidekazu Shiomi, Fukui (JP); Shoichi Takeshima, Fukui (JP); Hajime Arai, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 16/080,549

(22) PCT Filed: Mar. 16, 2017

(86) PCT No.: PCT/JP2017/010655
§ 371 (c)(1),
(2) Date: Aug. 28, 2018

(87) PCT Pub. No.: WO2017/164060
PCT Pub. Date: Sep. 28, 2017

(65) Prior Publication Data
US 2019/0009507 A1 Jan. 10, 2019

(30) Foreign Application Priority Data

Mar. 24, 2016 (JP) ................................. 2016-060679

(51) Int. Cl.
*B32B 27/08* (2006.01)
*B32B 7/02* (2019.01)
(Continued)

(52) U.S. Cl.
CPC ........ *B32B 27/08* (2013.01); *B29C 45/14688* (2013.01); *B32B 7/02* (2013.01);
(Continued)

(58) Field of Classification Search
None
See application file for complete search history.

(56) References Cited

U.S. PATENT DOCUMENTS

| 3,011,383 A | * 12/1961 | Sylvester ................. G02B 1/10 |
| | | 359/584 |
| 2005/0208275 A1 | * 9/2005 | Abe ........................ B32B 27/20 |
| | | 428/195.1 |

(Continued)

FOREIGN PATENT DOCUMENTS

| JP | 2005-324363 A | 11/2005 |
| JP | 2008-229997 A | 10/2008 |

(Continued)

*Primary Examiner* — Ashok Patel
(74) *Attorney, Agent, or Firm* — Norris McLaughlin, P.A.

(57) ABSTRACT

A decorative sheet is caused to emit light from part of the front surface to improve the design features. A decorative sheet 1 according to an embodiment includes a first refractive index layer (high refractive index layer) 11 having a first refractive index, a decorative layer 14, a second refractive index layer (low refractive index resin layer) 12 that has a second refractive index lower than the first refractive index and is provided between the first refractive index layer and the decorative layer, and a light diffusion layer 15 that is provided in partial contact with one surface of the first refractive index layer and diffuses light entering from the first refractive index layer so that light is released from part of the front surface of the decorative sheet. A resin molded body 21 may be integrally laminated on the back surface side of the decorative sheet 1 to form a decorative molded article 2. In addition, the decorative molded article 2 may be provided with a light source 31 that injects light from the side surface of the decorative sheet 1 to form a decorative module 3.

16 Claims, 6 Drawing Sheets (51) Int. Cl.
    *B32B 27/00*     (2006.01)
    *B29L 31/00*     (2006.01)
    *B32B 27/30*     (2006.01)
    *B32B 27/36*     (2006.01)
    *B29C 45/14*     (2006.01)
    *F21V 8/00*     (2006.01)

(52) U.S. Cl.
    CPC ............ *B32B 27/00* (2013.01); *B32B 27/308* (2013.01); *B32B 27/365* (2013.01); *G02B 6/005* (2013.01); *G02B 6/0051* (2013.01); *G02B 6/0065* (2013.01); *B29L 2031/722* (2013.01); *B32B 2255/10* (2013.01)

(56) References Cited

U.S. PATENT DOCUMENTS

| | | | |
|---|---|---|---|
| 2010/0104837 A1* | 4/2010 | Tanimoto | ............... D21H 27/26 |
| | | | 428/212 |
| 2010/0254009 A1* | 10/2010 | Chang | ............... B29C 45/14688 |
| | | | 359/585 |
| 2012/0196095 A1 | 8/2012 | Tanida et al. | |
| 2013/0329166 A1 | 12/2013 | Poliakine et al. | |

FOREIGN PATENT DOCUMENTS

| | | |
|---|---|---|
| JP | 2012-153107 A | 8/2012 |
| JP | 2013-098050 A | 5/2013 |
| JP | 2013-226671 A | 11/2013 |
| JP | 2013-238703 A | 11/2013 |
| JP | 2014-077821 A | 5/2014 |

\* cited by examiner

DECORATIVE SHEET, DECORATIVE MOLDED ARTICLE, AND DECORATIVE MODULE

TECHNICAL FIELD

Embodiments of the present invention relate to a decorative sheet and also to a decorative molded article and a decorative module using the decorative sheet.

BACKGROUND ART

For interior parts of vehicles, such as automobiles, and housings of electric products, a resin molded article having incorporated therein a decorative sheet is sometimes used to impart design features to the surface. As such a decorative molded article, for example, PTL 1 discloses an article in which colored projections are provided on the front surface of a resin sheet to form a decorative layer, while on the back surface of the resin sheet, a synthetic resin is injection-molded to integrally laminate a resin molded body. As a result, a decorative molded article having a surface appearance with a textured impression is obtained. However, the effect of improving the design features is caused only by the decorative layer, and no design effects are obtained in darkness, for example.

Meanwhile, PTL 2 discloses a decorative laminate including a transparent substrate, a first decorative layer provided on one surface of the substrate, a base material provided to face the transparent substrate through the first decorative layer, and a second decorative layer provided to face the transparent substrate through a low refractive index layer, wherein the second decorative layer is formed as a light guide plate. This literature discloses that the upper surface of the light guide plate is caused to glow, thereby making it possible to achieve illumination with an impression of greater depth, wherein the entire upper surface of the light guide plate is caused to glow. It is nowhere disclosed that a resin layer having a high refractive index is caused to partially glow.

CITATION LIST

Patent Literature

PTL 1: JP-A-2012-153107
PTL 2: JP-A-2014-077821

SUMMARY OF INVENTION

Technical Problem

In an embodiment, an object is as follows: in a decorative sheet having a design by a decorative layer, the decorative sheet is caused to emit light from part of the front surface, thereby improving the design features.

Solution to Problem

A decorative sheet according to an embodiment includes a first refractive index layer, a decorative layer, a second refractive index layer, and a light diffusion layer. The first refractive index layer has a first refractive index. The second refractive index layer is a resin layer having a second refractive index lower than the first refractive index and provided between the first refractive index layer and the decorative layer. The light diffusion layer is provided in partial contact with one surface of the first refractive index layer and diffuses light entering from the first refractive index layer so that light is released from part of the front surface of the decorative sheet.

A decorative molded article according to an embodiment has a three dimensional shape formed of the above decorative sheet. A decorative molded article according to another embodiment includes the above decorative sheet and a resin molded body integrally laminated on the back surface side of the decorative sheet. A decorative module according to an embodiment includes the above decorative molded article and a light source capable of injecting light into a side surface of the first refractive index layer.

DESCRIPTION OF EMBODIMENTS

In the decorative sheet according to an embodiment, when light is incident from the side surface of the decorative sheet, the light is totally reflected in the first refractive index layer having a relatively high refractive index and spreads in the first refractive index layer. At this time, light is diffused in the light diffusion layer, whereby the light is released from the front surface of the decorative sheet according to the installation position of the light diffusion layer. As a result of such partial light emission, the design, such as letters, symbols, figures, and patterns, corresponding to the installation position of the light diffusion layer can be emerged. Accordingly, in addition to the design effects caused by the decorative layer, design effects in darkness can be imparted, whereby the design features can be improved.

Hereinafter, embodiments will be described in detail with reference to the drawings. Incidentally, as used herein, the "front surface" of a decorative sheet is, of the front and back surfaces of the decorative sheet, the surface that is visible (the surface to which a design is applied) when used (i.e., when used as a decorative molded article). The "back surface" of a decorative sheet is the surface opposite to the front surface. In addition, the "front surface" of each layer, such as a first refractive index layer, is, of the front and back surfaces of the layer, the surface that faces in the same direction as the front surface of the decorative sheet, and the "back surface" of each layer is the surface opposite to the front surface of the layer.

(First Embodiment)

Figure 1:
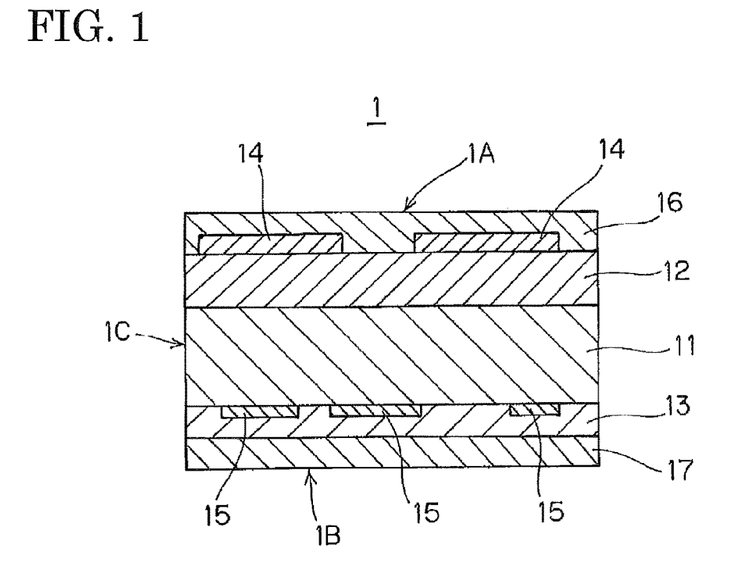
FIG. 1 is a schematic cross-sectional view of a decorative sheet according to a first embodiment.

As shown in FIG. 1, a decorative sheet (1) according to a first embodiment includes a high refractive index layer (11) as a first refractive index layer, a low refractive index resin layer (12) as a second refractive index layer, a low refractive index resin layer (13) as a third refractive index layer, a decorative layer (14), a light diffusion layer (15), a protective layer (16), and a base layer (17).

As used herein, the terms "high" and "low" of the high refractive index layer and the low refractive index resin layer express the magnitude relation between their refractive indices. That is, the high refractive index layer has a higher refractive index than the low refractive index resin layer, and the low refractive index resin layer has a lower refractive index than the high refractive index layer.

The high refractive index layer (11) is a light transmission layer having a first refractive index $n_1$ that is higher than the refractive indices of the low refractive index resin layers (12) and (13). The first refractive index (absolute refractive index) $n_1$ may be 1.40 to 1.70, for example, or may also be 1.50 to 1.60.

As used herein, a refractive index (absolute refractive index) is a refractive index for light at a wavelength of 589 nm (D line). In the Examples below, refractive indices were measured using an Abbe refractometer ("DR-M4" manufactured by Atago Co., Ltd.) at an environmental temperature of 25° C.

In one embodiment, the high refractive index layer (11) is a resin layer or glass layer made of a resin or glass. As the high refractive index layer (11), a resin sheet may also be used. Examples thereof include sheets made of various thermoplastic resins, including polycarbonate resins (PC); polyester resins such as polyethylene terephthalate (PET); acrylic resins such as polymethyl methacrylate (PMMA); styrenic resins such as polystyrene resins, acrylonitrile-styrene copolymer resins (AS resins), and acrylonitrile-butadiene-styrene copolymers (ABS); polyolefin resins such as polyethylene and polypropylene; and blends of two or more kinds of them. As the high refractive index layer (11), a glass plate made of lead glass or soda lime glass may also be used. It is preferable that the high refractive index layer (11) is made of a thermoplastic resin. The high refractive index layer (11) is more preferably a resin sheet, and still more preferably a sheet made of a polycarbonate resin.

The high refractive index layer (11) is sandwiched between the low refractive index resin layer (12) and the low refractive index resin layer (13). That is, the configuration is such that the low refractive index resin layers (12) and (13) are provided on the front surface and back surface of the high refractive index layer (11), respectively, and the high refractive index layer (11) is sandwiched between these low refractive index resin layers (12) and (13). As a result, light incident from a side surface (1C) of the decorative sheet (1) is totally reflected at the front and back interfaces of the high refractive index layer (11), trapped in the high refractive index layer (11), and laterally transferred. That is, light spreads throughout the high refractive index layer (11). Like this, the high refractive index layer (11) is a layer that laterally guides (transfers) light incident from the side surface thereof, and thus is preferably transparent or semi-transparent, and more preferably colorless and transparent. The thickness of the high refractive index layer (11) is not particularly limited and may be 0.1 to 2.0 mm, for example, or may also be 0.2 to 1.0 mm.

The low refractive index resin layer (12) as a second refractive index layer is a light transmission layer having a lower refractive index than that of the high refractive index layer (11) and has a second refractive index $n_2$ that is lower than the first refractive index $n_1$ ($n_1 > n_2$). The second refractive index (absolute refractive index) $n_2$ may be 1.35 to 1.65, for example, or may also be 1.35 to 1.50. In addition, it is preferable that the difference between the first refractive index $n_1$ and the second refractive index $n_2$ ($n_1 - n_2$) is 0.05 or more, more preferably 0.10 or more. The upper limit of the difference is not particularly set and may be 0.30 or less, for example.

Examples of resins for forming the low refractive index resin layer (12) include acrylic resins such as polymethyl methacrylate (PMMA) and urethane acrylate resins; styrenic resins such as polystyrene resins, acrylonitrile-styrene copolymer resins (AS resins), and acrylonitrile-styrene-butadiene copolymer resins (ABS resins); polyolefin resins such as polyethylene and polypropylene; and blends of two or more kinds of them. The low refractive index resin layer (12) is preferably transparent or semi-transparent, and more preferably colorless and transparent.

The low refractive index resin layer (12) is provided between the high refractive index layer (11) and the decorative layer (14). When the low refractive index resin layer (12) is interposed between the high refractive index layer (11) and the decorative layer (14), the release of light from the high refractive index layer (11) due to the decorative layer (14) can be prevented.

In this example, the low refractive index resin layer (12) is a film provided to cover the entire front surface of the high refractive index layer (11) and directly laminated on the front surface of the high refractive index layer (11). The method for forming the low refractive index resin layer (12) is not particularly limited and may be, for example, a known coating method, such as spraying, dipping, spin coating, or bar coating, or printing method, such as ink jet printing or screen printing. The thickness of the low refractive index resin layer (12) may be 3 to 30 μm, for example, or may also be 5 to 20 μm.

The low refractive index resin layer (13) as a third refractive index layer is a light transmission layer having a lower refractive index than that of the high refractive index layer (11) and has a third refractive index $n_3$ that is lower than the first refractive index $n_1$ ($n_1 > n_3$). The third refractive index (absolute refractive index) $n_3$ may be the same as or different from the second refractive index $n_2$, and may be 1.35 to 1.65, for example, or may also be 1.35 to 1.50. In addition, it is preferable that the difference between the first refractive index $n_1$ and the third refractive index $n_3$ ($n_1 - n_3$) is 0.05 or more, more preferably 0.10 or more. The upper limit of the difference is not particularly set and may be 0.30 or less, for example. As the resin for forming the low refractive index resin layer (13), the same resins as for the low refractive index resin layer (12) are applicable. The low refractive index resin layer (13) is preferably transparent or semi-transparent, and more preferably colorless and transparent.

The low refractive index resin layer (13) is provided on the back surface of the high refractive index layer (11). In this example, the light diffusion layer (15) is provided on part of the back surface of the high refractive index layer (11). Thus, a film of the low refractive index resin layer (13) is formed over the entire back surface of the high refractive index layer (11) including the light diffusion layer (15) so as to cover the light diffusion layer (15). The low refractive index resin layer (13) can be formed by the same known coating method or printing method as for the low refractive index resin layer (12). The thickness of the low refractive index resin layer (13) may be 3 to 30 μm, for example, or may also be 5 to 20 μm.

The decorative layer (14) is a layer for expressing a desired design on the front surface (1A) of the decorative sheet (1). The design is not particularly limited, and examples thereof include patterns (motifs) such as woodgrain-like patterns, metal-like patterns, textile-like patterns, and geometrical patterns, images such as drawings and photographs, letters, symbols, and figures, as well as combinations of two or more kinds of them. The decorative layer (14) may be formed as a layer continuous over the entire decorative sheet (1), but in this example, as shown in FIG. 1, the layer is formed as a discontinuous layer on part of the surface.

In this example, the decorative layer (14) is provided on the front surface side of the high refractive index layer (11) through the low refractive index resin layer (12) and directly laminated on the front surface of the low refractive index resin layer (12). In this example, the decorative layer (14) has light transmittance and is configured such that light diffused in the light diffusion layer (15) transmits through the decorative layer (14) and is radiated to the front surface. The thickness of the decorative layer (14) is not particularly limited. For example, the thickness of the thickest part may be 20 to 200 μm or may also be 40 to 150 μm.

The decorative layer (14) may also be a layer made of a colorant-containing resin. In this case, in order to form a design, the decorative layer (14) can be formed by a printing method capable of patterning, such as ink jet printing or screen printing.

The resin for forming the decorative layer (14) is not particularly limited. Examples thereof include acrylic resins such as polymethyl methacrylate (PMMA) and urethane acrylate resins; styrenic resins such as polystyrene resins, acrylonitrile-styrene copolymer resins (AS resins), and acrylonitrile-styrene-butadiene copolymer resins (ABS resins); polyolefin resins such as polyethylene and polypropylene; and blends of two or more kinds of them. The colorant may be a pigment, such as an organic pigment or an inorganic pigment, or may also be a dye, such as an oil-soluble dye, a disperse dye, an acidic dye, a reactive dye, a cationic dye, or a direct dye. Incidentally, the refractive index of the resin forming the decorative layer (14) is not particularly limited, and the refractive index may be the same as, higher than, or lower than that of the adjacent low refractive index resin layer (12).

The decorative layer (14) is not limited to a layer made of a colorant-containing resin. For example, the layer may also be formed of a sheet material having design such as a pattern, such as a sliced veneer (a thin slice of wood) or Japanese paper. When such a sheet material has a thickness as small as 200 μm, for example, the sheet has light transmittance and thus functions as the decorative layer (14) in the present embodiment. In the case where such a sheet material is used, for example, it is possible that the low refractive index resin layer (12) is allowed to function also as an adhesive layer, and the sheet material is attached thereto, thereby providing the decorative layer (14). Alternatively, it is also possible that the sheet material is sandwiched between the low refractive index resin layer (12) and the protective layer (16), thereby providing the decorative layer (14).

The light diffusion layer (15) is a layer that is provided in partial contact with one surface of the high refractive index layer (11) and diffuses light entering from the high refractive index layer (11) so that light is released from part of a front surface (1A) of the decorative sheet (1). As described above, light incident from the side surface (1C) of the decorative sheet (1) is trapped and transferred in the high refractive index layer (11) due to total reflection. At this time, when light is incident on the light diffusion layer (15), light is diffused, that is, released at various angles. Accordingly, this causes light incident nearly perpendicularly on the low refractive index resin layer (12). That is, light is incident on the low refractive index resin layer (12) at an angle lower than the critical angle. Such light is not totally reflected but enters the low refractive index resin layer (12) and transmits therethrough, and thus is radiated from the front surface (1A) of the decorative sheet (1). Therefore, in the installation position of the light diffusion layer (15), light can be taken out from the front surface (1A) of the decorative sheet (1).

In this example, the light diffusion layer (15) is provided in partial contact with the back surface of the high refractive index layer (11) and directly laminated on the back surface. Because the low refractive index resin layer (13) is provided on the back surface of the high refractive index layer (11) as described above, the light diffusion layer (15) is provided at the interface between the high refractive index layer (11) and the low refractive index resin layer (13).

As described above, the light diffusion layer (15) is a layer that allows light to be taken out to emerge a design. Therefore, in order to form such a design, on one surface of the high refractive index layer (11), the light diffusion layer (15) is not formed over the entire surface but is formed in a predetermined region of the surface. That is, the layer is provided in a position corresponding to the design formed of letters, symbols, figures, patterns, and or a combination of two or more kinds of them. Therefore, the light diffusion layer (15) is formed by a printing method capable of patterning, such as ink jet printing or screen printing. The thickness of the light diffusion layer (15) is not particularly limited and may be 0.5 to 20 μm, for example, or may also be 1 to 10 μm. Incidentally, the design by the light diffusion layer (15) may be formed in association with the design by the decorative layer (14), but may also be formed independently of each other. When the design of the light diffusion layer (15) and that of the decorative layer (14) are associated with each other, the design effects can be further enhanced.

In this example, the light diffusion layer (15) is a light scattering layer that is made of a resin containing particles and scatters incident light with particles. Examples of particles dispersed in the resin include titanium oxide, calcium carbonate, glass beads, and an aluminum powder. They may be used alone, and it is also possible to use a combination of two or more kinds. The particle size of particles is not particularly limited. For example, the 50% volume particle size (D50) may be 100 to 4,000 nm or may also be 200 to 800 nm.

The resin for forming the light diffusion layer (15) or a light scattering layer is not particularly limited. Examples thereof include acrylic resins such as polymethyl methacrylate (PMMA) and urethane acrylate resins; styrenic resins such as polystyrene resins, acrylonitrile-styrene copolymer resins (AS resins), and acrylonitrile-styrene-butadiene copolymer resins (ABS resins); polyolefin resins such as polyethylene and polypropylene; and blends of two or more kinds of them. The refractive index of the resin may be lower or higher than the refractive index of the adjacent high refractive index layer (11). In the case where a resin having a refractive index lower than that of the high refractive index layer (11) is used, light is totally reflected at the interface between the high refractive index layer (11) and the light diffusion layer (15). As a result, only the particles present at the interface contribute to diffusion (light scattering), and, accordingly, a design having a clear border is likely to be obtained. Meanwhile, in the case where the resin having a refractive index the same as or higher than that of the high refractive index layer (11) is used, light enters the inside of the light diffusion layer (15). As a result, the diffusion (light scattering) effect can be enhanced.

The protective layer (16) is an optional transparent resin layer formed on the outermost surface of the decorative sheet (1) in order to protect the front surface (1A) of the decorative sheet (1). In this example, the protective layer (16) is formed over the entire front surface of the low refractive index resin layer (12) including the decorative layer (14) so as to cover the decorative layer (14). The protective layer (16) can be formed by the same known coating method or printing method as for the low refractive index resin layer (12). The thickness of the protective layer (16) is not particularly limited and may be 50 to 1,000 μm, for example, or may also be 100 to 500 μm.

The protective layer (16) is a light transmission layer made of a transparent resin. The layer is preferably colorless and transparent but may also be colored and transparent. Examples of resins for forming the protective layer (16) include a polyester resin, a polyurethane resin, an acrylic resin, a silicone resin, an epoxy resin, an alkyd resin, and an amino alkyd resin. They may be used alone, or it is also possible to use a blend of two or more kinds. The refractive index of the protective layer (16) is not particularly limited and may be lower or higher than the refractive index of the adjacent low refractive index resin layer (12).

The base layer (17) is an optional resin layer provided on a back surface (1B) side of the decorative sheet (1). The layer is provided for the purpose of applying a color to assist the design by the decorative layer (14) or enhancing the adhesion with a below-described resin molded body (21). In this example, the base layer (17) is formed over the entire back surface of the low refractive index resin layer (13). The base layer (17) can be formed by the same known coating method or printing method as for the low refractive index resin layer (12). The thickness of the base layer (17) may be 0.1 to 300 μm, for example, or may also be 5 to 80 μm.

Examples of resins for forming the base layer (17) include a polyester resin, a polyurethane resin, an acrylic resin, a silicone resin, an epoxy resin, an alkyd resin, and an amino alkyd resin. They may be used alone, or it is also possible to use a blend of two or more kinds. In addition, for coloring, it is also possible to incorporate colorants, such as organic pigments, inorganic pigments, and like pigments and dyes.

Figure 2:
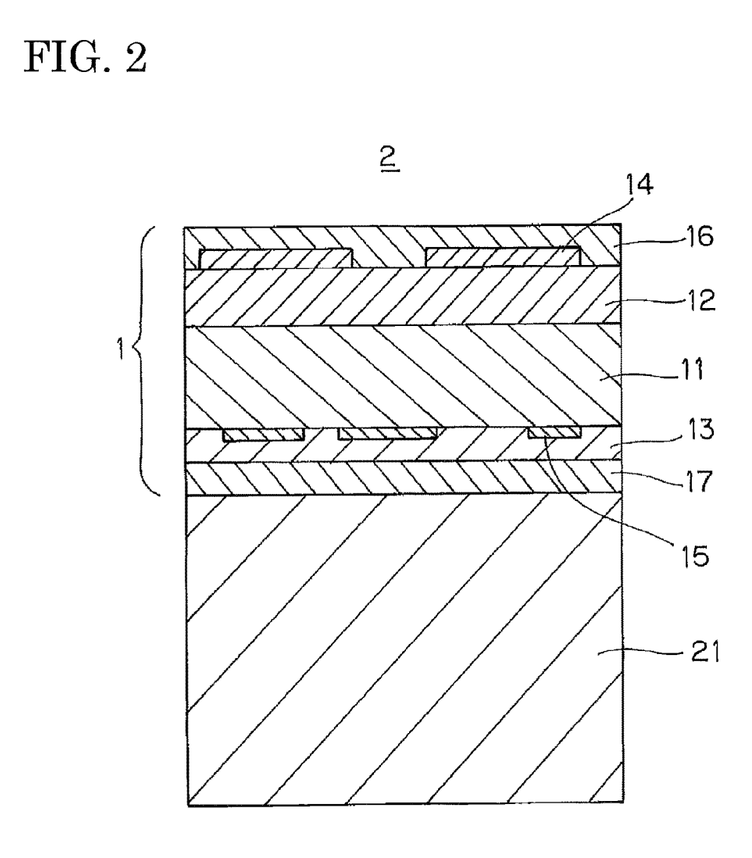
FIG. 2 is a schematic cross-sectional view of a decorative molded article using the decorative sheet.

The method for producing the decorative sheet (1) is not particularly limited and may be as follows, for example. On one surface (front surface) of a resin sheet or glass plate as the high refractive index layer (11), the low refractive index resin layer (12), the decorative layer (14), and the protective layer (16) are successively laminated. Meanwhile, on the other surface (back surface) of the resin sheet, the light diffusion layer (15), the low refractive index resin layer (13), and the base layer (17) are successively laminated. The order of lamination on the front surface and the back surface is not particularly limited, and it is also possible that a layer on the front surface and a layer on the back surface are alternately formed. Incidentally, in the case where a decorative molded article (2) shown in FIG. 2 is produced, the protective layer (16) may be provided before molding the resin molded body (21). Alternatively, it is also possible that the protective layer (16) is formed on the front surface of the decorative sheet (1) after molding the resin molded body (21).

As shown in FIG. 2, the decorative molded article (2) according to the first embodiment includes the decorative sheet (1) and the resin molded body (21) integrally laminated on the back surface (1B) side of the decorative sheet (1). The resin molded body (21) is provided on the back surface side of the high refractive index layer (11) through at least the low refractive index resin layer (13). In this example, the resin molded body (21) is provided on the back surface side of the high refractive index layer (11) through the light diffusion layer (15), the low refractive index resin layer (13), and the base layer (17) and integrally laminated on the back surface of the base layer (17).

Examples of resins for forming the resin molded body (21) include various synthetic resins, including styrenic resins such as polystyrene (PS) and acrylonitrile butadiene styrene (ABS), olefinic resins such as polyethylene (PE) and polypropylene (PP), polycarbonate resins (PC), and acrylic resins. They may be used alone, or it is also possible to use a blend of two or more kinds. In addition, for coloring, it is also possible to incorporate colorants, such as organic pigments, inorganic pigments, and like pigments and dyes.

The decorative molded article (2) can be produced using a known insert molding method. Specifically, the decorative sheet (1) is pre-molded in advance by vacuum-molding processing or pressure-molding processing, and then the resin molded body (21) is injection-molded using the pre-molded decorative sheet (1), thereby giving the decorative molded article (2). In pre-molding, the decorative sheet (1) is pressed to the die surface at elevated or reduced pressure with heating, and formed into a three dimensional shape close to the end product. Next, the pre-molded decorative sheet (1) is disposed in an injection molding die, and a molten synthetic resin is injected into the cavity, thereby integrally laminating the resin molded body (21) on the back surface of the decorative sheet (1). As a result, the decorative molded article (2) having a three dimensional shape as shown in FIG. 3, for example, is obtained.

Figure 3:
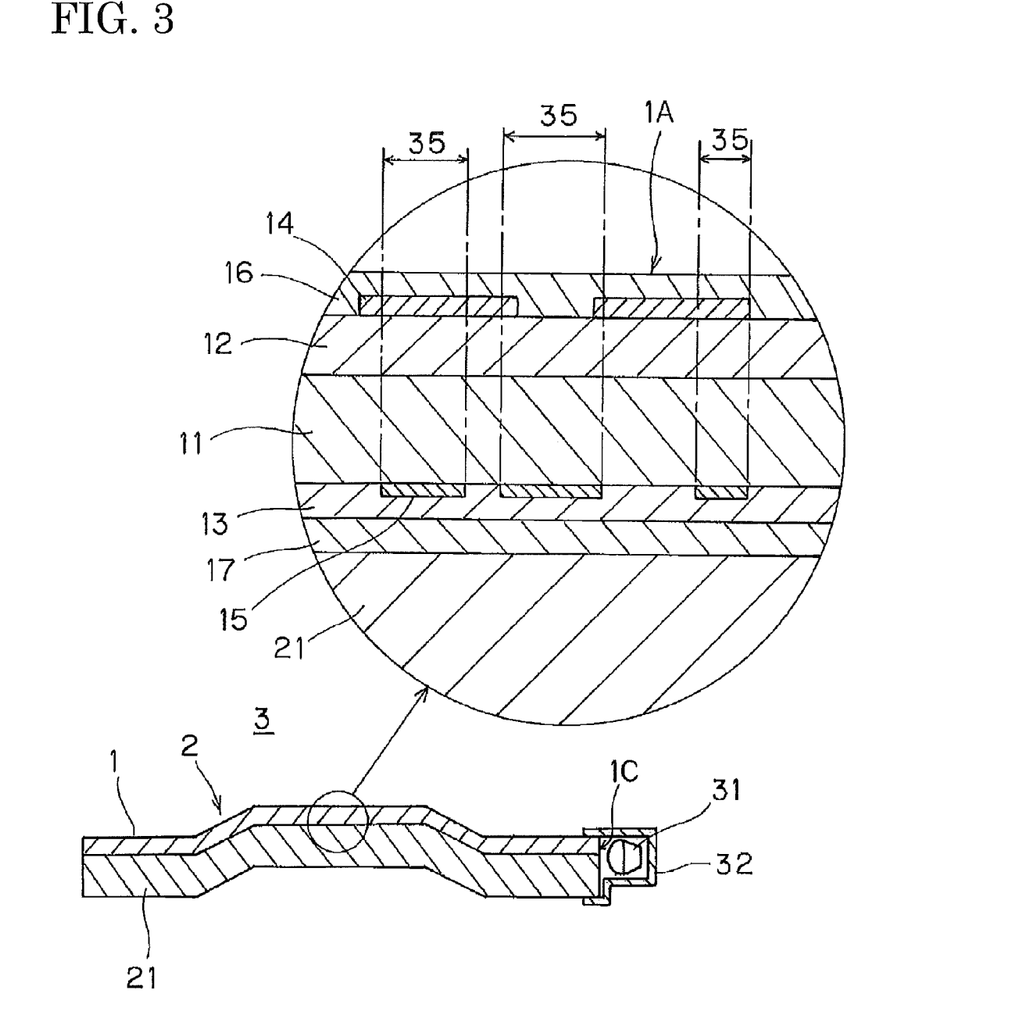
FIG. 3 is a schematic cross-sectional view of a decorative module using the decorative molded article.

As shown in FIG. 3, a decorative module (3) according to the first embodiment includes the decorative molded article (2) and, on the side surface (1C) of the decorative sheet (1) in the decorative molded article (2), more specifically on the side surface of the high refractive index layer (11), a light source (31) capable of injecting light. As the light source (31), for example, a light-emitting diode (LED) can be used. The light source (31) is provided to an edge portion on at least part of the entire periphery of the decorative molded article (2) in such a manner that at the edge portion, light can be applied to the side surface (1C) of the decorative sheet (1). For example, on one side of the decorative molded article (2) having a polygonal shape, a plurality of light sources may be arranged along the side. In this example, the light source (31) is attached to a part of an edge portion of the decorative molded article (2) with a holder (32). Incidentally, although not shown, the decorative module (3) may also be configured to include wires to the light source (31), electrical machinery parts such as a power supply and a controller, and also other parts such as a frame.

In the first embodiment as above, when light is incident from the side surface (1C) of the decorative sheet (1), the light is trapped in the high refractive index layer (11) due to total reflection and spreads in the high refractive index layer (11). At this time, when light is incident on the light diffusion layer (15), the light is scattered therein, causing light incident nearly perpendicularly on the low refractive index resin layer (12). Such light is not totally reflected but enters the low refractive index resin layer (12) and transmits therethrough, and thus is radiated from the front surface (1A) of the decorative sheet (1). The light is released from the front surface (1A) of the decorative sheet (1) in the installation position of the light diffusion layer (15), and such a release position serves as a light-emitting part (35) (see FIG. 3). Accordingly, because of the light-emitting part 35, the design, such as letters, symbols, figures, and patterns, corresponding to the installation position of the light diffusion layer (15) can be emerged. Therefore, in addition to the design effects caused by the decorative layer (14), the light-emitting part (35) can impart design effects in darkness. Thus, together with the decorative layer (14), high design features can be expressed.

In the first embodiment, because the decorative layer (14) is provided on the front surface side of the high refractive index layer (11), the design can be expressed more clearly. In addition, because the light scattering layer (15) is provided on the back surface side of the high refractive index layer (11), the light diffusion layer is less noticeable and thus does not affect the design at the time of non-light emission.

(Second Embodiment)

Figure 4:
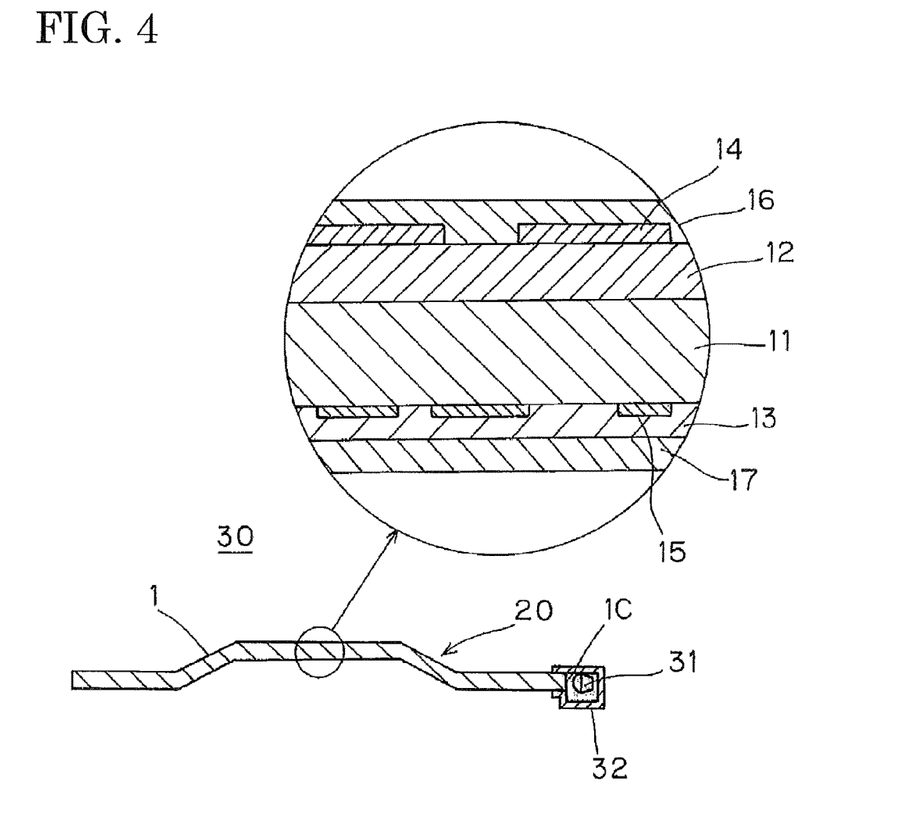
FIG. 4 is a schematic cross-sectional view of a decorative module according to a second embodiment.

As shown in FIG. 4, a decorative module (30) according to a second embodiment includes a decorative molded article (20) having a three dimensional shape formed of the decorative sheet (1) and, on the side surface (1C) of the decorative sheet (1), more specifically on the side surface of the high refractive index layer (11), the light source (31) capable of injecting light. That is, in this embodiment, the decorative molded article (20) does not have the resin molded body (21) as in the first embodiment, but is composed only of the decorative sheet (1). Like this, the resin molded body (21) is not essential, and it is possible that only the decorative sheet (1) is molded into a predetermined shape to form the decorative module (30). The configuration and operation effects of the second embodiment are the same as in the first embodiment in other respects, and the descriptions thereof will be omitted.

(Third Embodiment)

Figure 5:
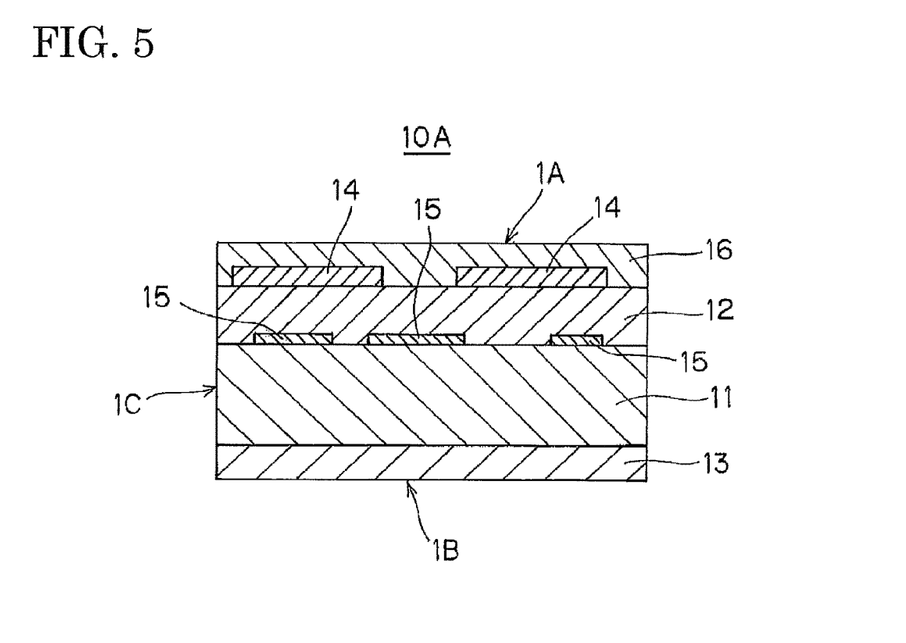
FIG. 5 is a schematic cross-sectional view of a decorative sheet according to a third embodiment.

As shown in FIG. 5, a decorative sheet (10A) according to a third embodiment is different from the decorative sheet (1) according to the first embodiment in that the light diffusion layer (15) is provided at the interface between the high refractive index layer (11) and the low refractive index resin layer (12). That is, in the third embodiment, the decorative layer (14) is provided on the front surface side of the high refractive index layer (11) through the low refractive index resin layer (12), and the light diffusion layer (15) is provided at the interface between the high refractive index layer (11) and the low refractive index resin layer (12).

Specifically, the light diffusion layer (15) is provided in partial contact with the front surface of the high refractive index layer (11), and the low refractive index resin layer (12) is laminated thereon to entirely cover the high refractive index layer (11) including the light diffusion layer (15). Then, the decorative layer (14) is provided on the front surface of the low refractive index resin layer (12), and further the protective layer (16) is laminated thereon to entirely cover the low refractive index resin layer (12) including the decorative layer (14). Meanwhile, on the back surface side of the high refractive index layer (11), the low refractive index resin layer (13) is laminated over the entire surface. Incidentally, the base layer is an optional layer and is not provided in this example.

Figure 6:
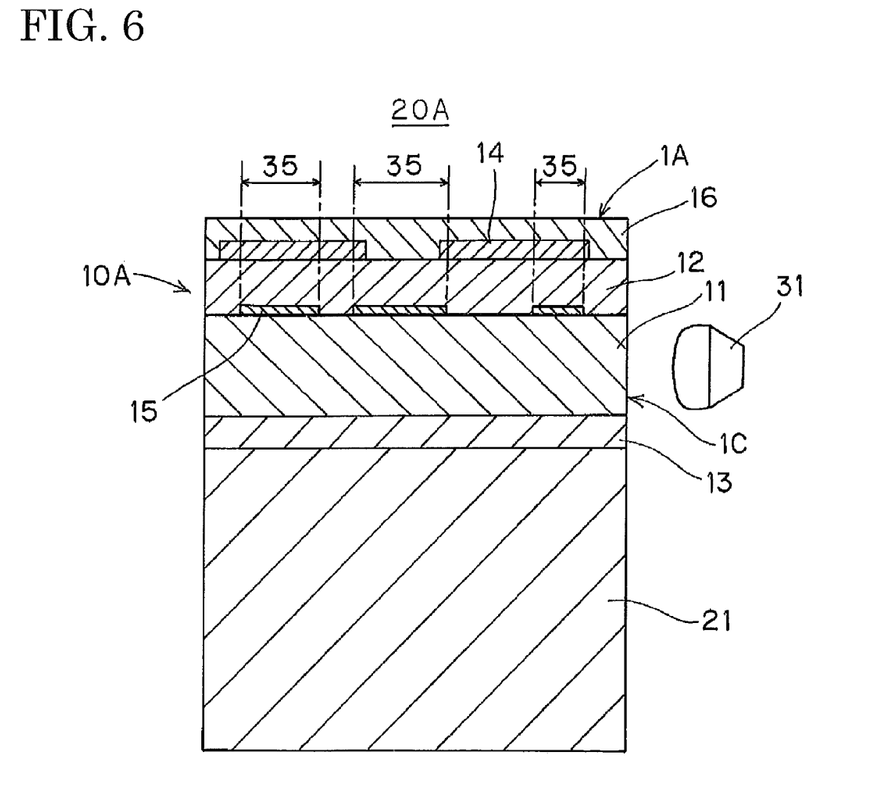
FIG. 6 is a schematic cross-sectional view of a decorative molded article according to the third embodiment.

As shown in FIG. 6, a decorative molded article (20A) according to the third embodiment includes the decorative sheet (10A) and the resin molded body (21) integrally laminated on the back surface (1B) side of the decorative sheet (10A). In this example, the resin molded body (21) is provided on the back surface side of the high refractive index layer (11) through the low refractive index resin layer (13) and integrally laminated on the back surface of the low refractive index resin layer (13).

In the third embodiment, when light from the light source (31) is incident from the side surface (1C) of the decorative sheet (10A), the light is totally reflected and spreads in the high refractive index layer (11). At this time, when light is incident on the light diffusion layer (15), the light is scattered therein. Thus, the light is not totally reflected but transmits through the low refractive index resin layer (12), and is radiated from the front surface (1A) of the decorative sheet (10A). Therefore, as in the first embodiment, the installation position of the light diffusion layer (15) serves as the light-emitting part (35) (see FIG. 6), and the design, such as letters, symbols, figures, and patterns, corresponding to the installation position of the light diffusion layer (15) can be emerged.

In the third embodiment, because the decorative layer (14) is provided on the front surface side of the high refractive index layer (11), a clearer design can be expressed. In addition, because the light diffusion layer (15) is provided on the front side of the high refractive index layer (11), the light emission can be made brighter and clearer than in the first embodiment. Incidentally, the configuration of the third embodiment is the same as in the first embodiment in other respects, and the description thereof will be omitted.

(Fourth Embodiment)

Figure 7:
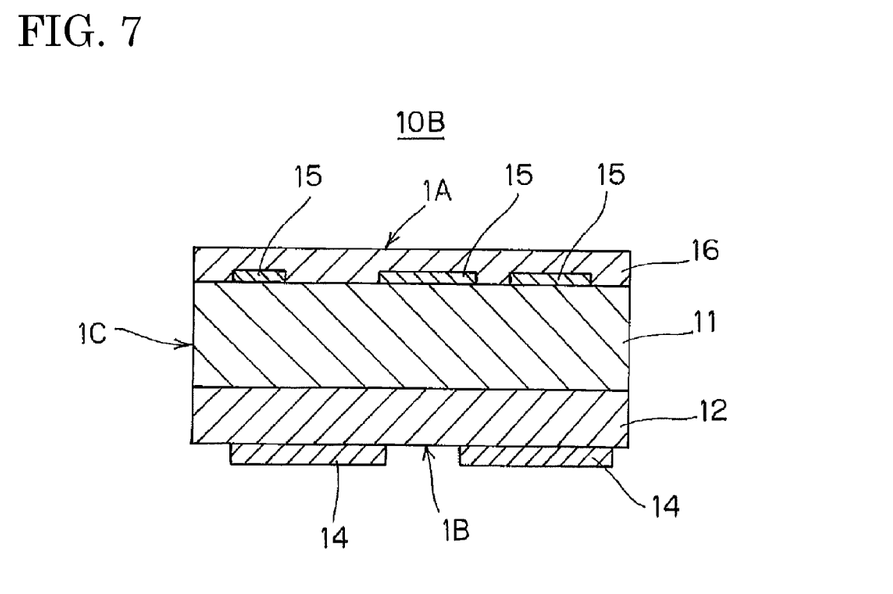
FIG. 7 is a schematic cross-sectional view of a decorative sheet according to a fourth embodiment.

As shown in FIG. 7, a decorative sheet (10B) according to a fourth embodiment is different from the decorative sheet (1) according to the first embodiment in that the decorative layer (14) is provided on the back surface side of the high refractive index layer (11). In the fourth embodiment, the decorative layer (14) is provided on the back surface side of the high refractive index layer (11) through the low refractive index resin layer (12) as the second refractive index layer, and the light diffusion layer (15) is provided in partial contact with the front surface of the high refractive index layer (11).

Specifically, the light diffusion layer (15) is provided in partial contact with the front surface of the high refractive index layer (11), and the protective layer (16) is laminated thereon so as to entirely cover the high refractive index layer (11) including the light diffusion layer (15). Meanwhile, on the back surface of the high refractive index layer (11), the low refractive index resin layer (12) having the second refractive index $n_2$ is laminated over the entire surface, and the decorative layer (14) is provided on the back surface of the low refractive index resin layer (12). Incidentally, the base layer is an optional layer and is not provided in this example.

Figure 8:
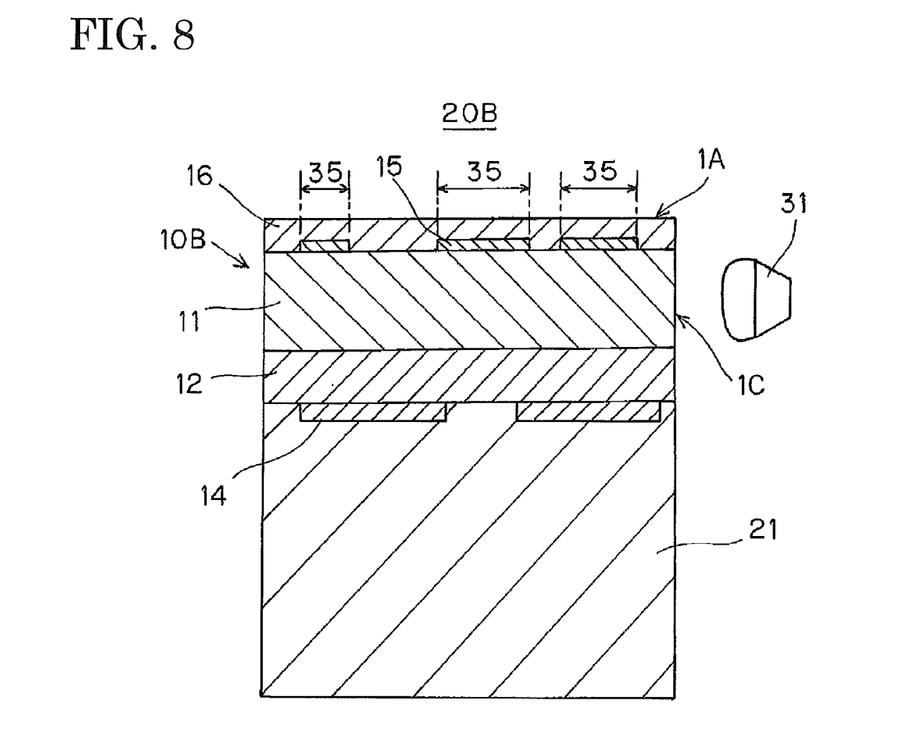
FIG. 8 is a schematic cross-sectional view of a decorative molded article according to the fourth embodiment.

As shown in FIG. 8, a decorative molded article (20B) according to the fourth embodiment includes the decorative sheet (10B) and the resin molded body (21) integrally laminated on the back surface (1B) side of the decorative sheet (10B). In this example, the resin molded body (21) is provided on the back surface side of the high refractive index layer (11) through the low refractive index resin layer (12) and the decorative layer (14) and integrally laminated on the back surfaces thereof.

In the fourth embodiment, when light from the light source (31) is incident from the side surface (1C) of the decorative sheet (10B), the light is totally reflected and spreads in the high refractive index layer (11). Here, although no low refractive index resin layer is provided on the front surface of the high refractive index layer (11), in the case where the protective layer (16) has a smaller refractive index than that of the high refractive index layer (11), the protective layer (16) functions as a low refractive index resin layer. In addition, even if the protective layer (16) has a higher refractive index than that of the high refractive index layer (11), because the protective layer (16) faces an air layer having a low refractive index, light is trapped and spreads in the inside of the high refractive index layer (11) and the protective layer (16). At this time, when light is incident on the light diffusion layer (15), the light is scattered therein and thus radiated from the front surface (1A) of the decorative sheet (10B). Therefore, as in the first embodiment, the installation position of the light diffusion layer (15) serves as the light-emitting part (35) (see FIG. 8), and the design, such as letters, symbols, figures, and patterns, corresponding to the installation position of the light diffusion layer (15) can be emerged.

In the fourth embodiment, because the decorative layer (14) is provided on the back surface side of the high refractive index layer (11), a design with an impression of greater depth can be expressed. In addition, because the light diffusion layer (15) is provided on the front side of the high refractive index layer (11), the effect that light will look like floating can be imparted. Incidentally, the configuration of the fourth embodiment is the same as in the first embodiment in other respects, and the description thereof will be omitted.

(Fifth Embodiment)

Figure 9:
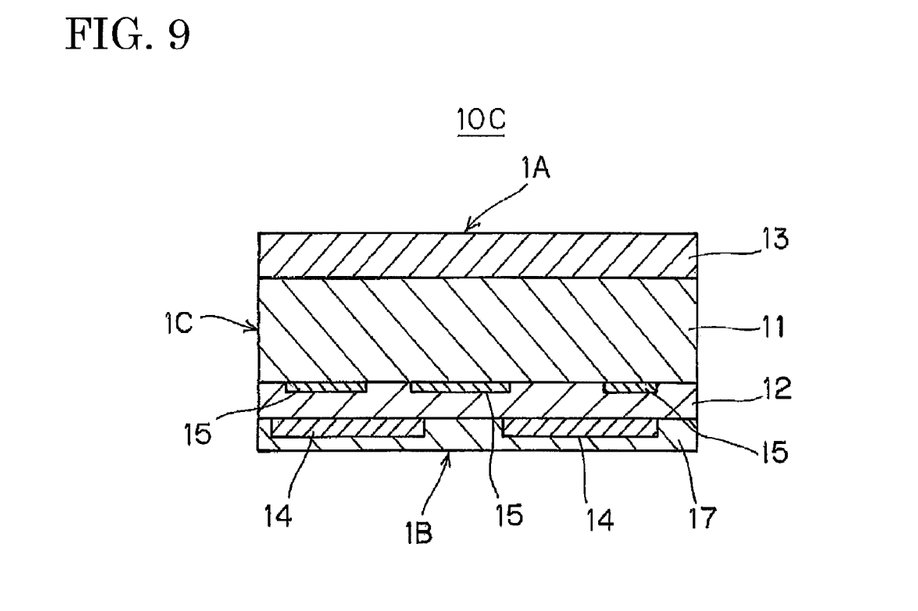
FIG. 9 is a schematic cross-sectional view of a decorative sheet according to a fifth embodiment.

As shown in FIG. 9, a decorative sheet (10C) according to a fifth embodiment is different from the decorative sheet (10B) according to the fourth embodiment in that the light diffusion layer (15) is provided at the interface between the high refractive index layer (11) and the low refractive index resin layer (12). That is, in the fifth embodiment, the decorative layer (14) is provided on the back surface side of the high refractive index layer (11) through the low refractive index resin layer (12) as the second refractive index layer, and the light diffusion layer (15) is provided at the interface between the high refractive index layer (11) and the low refractive index resin layer (12). In addition, in the fifth embodiment, the low refractive index resin layer (13) as the third refractive index layer is provided on the front surface of the high refractive index layer (11).

Specifically, the light diffusion layer (15) is provided in partial contact with the back surface of the high refractive index layer (11), and a film of the low refractive index resin layer (12) having the second refractive index $n_2$ is formed over the entire back surface of the high refractive index layer (11) including the light diffusion layer (15) so as to cover the light diffusion layer (15). Then, the decorative layer (14) is provided on the back surface of the low refractive index resin layer (12), and the base layer (17) is laminated on the entire back surface of the low refractive index resin layer (12) including the decorative layer (14) so as to cover the decorative layer (14). Meanwhile, on the front surface of the high refractive index layer (11), the low refractive index resin layer (13) having the third refractive index $n_3$ is laminated over the entire surface, and no protective layer is provided.

Figure 10:
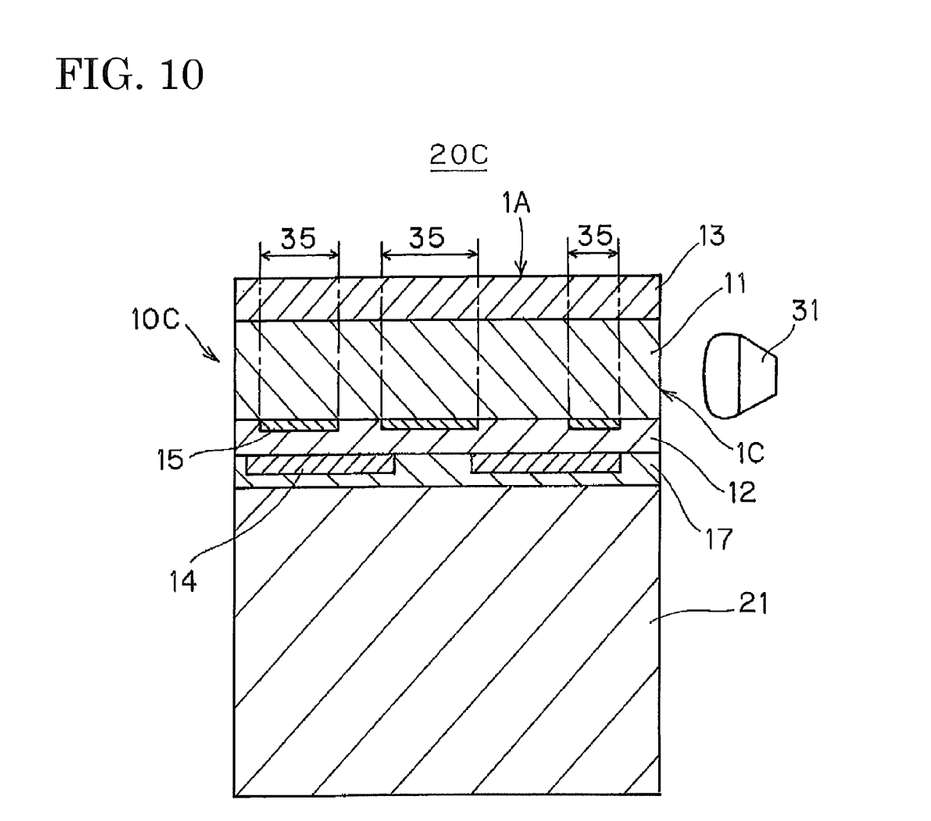
FIG. 10 is a schematic cross-sectional view of a decorative molded article according to the fifth embodiment.

As shown in FIG. 10, a decorative molded article (20C) according to the fifth embodiment includes the decorative sheet (10C) and the resin molded body (21) integrally laminated on the back surface (1B) side of the decorative sheet (10C). In this example, the resin molded body (21) is provided on the back surface side of the high refractive index layer (11) through the light diffusion layer (15), the low refractive index resin layer (12), the decorative layer (14), and the base layer (17) and integrally laminated on the back surface of the base layer (17).

In the fifth embodiment, when light from the light source (31) is incident from the side surface (1C) of the decorative sheet (10C), the light is totally reflected and spreads in the high refractive index layer (11). At this time, when light is incident on the light diffusion layer (15), the light is scattered therein. Thus, some of the light transmits through the high refractive index resin layer (11) and the low refractive index resin layer (13) and is radiated from the front surface (1A) of the decorative sheet (10C). Therefore, as in the fourth embodiment, the installation position of the light diffusion layer (15) serves as the light-emitting part (35) (see FIG. 10), and the design, such as letters, symbols, figures, and patterns, corresponding to the installation position of the light diffusion layer (15) can be emerged.

In the fifth embodiment, because the decorative layer (14) is provided on the back surface side of the high refractive index layer (11), a design with an impression of greater depth can be expressed. In addition, because the light diffusion layer (15) is provided on the back side of the high refractive index layer (11), the outermost surface is flat, and a glossy impression can be presented. Incidentally, the configuration of the fifth embodiment is the same as in the fourth embodiment in other respects, and the description thereof will be omitted.

(OTHER Embodiments)

In the above embodiments, the light diffusion layer (15) is a light scattering layer made of a resin having dispersed therein particles. However, the light diffusion layer (15) may also be a fluorescent layer containing a fluorescent substance. Fluorescence herein includes not only fluorescence in a narrow sense, which has a short emission lifetime, but also fluorescence in a broader sense, such as phosphorescence, which has a long emission lifetime. A fluorescent layer is a layer made of a resin containing a fluorescent substance, such as a fluorescent dye, and emits light towards various angles in response to light. Therefore, such a layer functions as the light diffusion layer (15).

The resin molded body (21) may be provided on the back surface side of a first refractive index layer (high refractive index layer (11)) at least through a second refractive index layer (low refractive index resin layer (12)) or a third refractive index layer (low refractive index resin layer (13)). Incidentally, in the above third, fourth, and fifth embodiments, the resin molded body (21) is integrally laminated on the back surface side of the decorative sheet. However, the decorative molded article may also be composed only of the decorative sheet (10A), (10B), or (10C) molded in a three dimensional shape as in the second embodiment.

In the second embodiment shown in FIG. 4, the low refractive index resin layer (13) as a third refractive index layer is not essential and may be omitted together with the base layer (17). This is because even without the low refractive index resin layer (13), because an air layer having a low refractive index faces the back surface of the high refractive index layer (11), light can be trapped in the high refractive index layer (11). Similarly, in the third embodiment shown in FIG. 5, in the case where the decorative molded article is composed of the decorative sheet (10A) alone, the low refractive index resin layer (13) as a third refractive index layer can be omitted.

In the fourth embodiment shown in FIG. 7, it is also possible that the low refractive index resin layer (13) as a third refractive index layer is provided over the entire front surface of the high refractive index layer (11) including the light diffusion layer (15) so as to cover the light diffusion layer (15). Incidentally, the protective layer (16) is an optional layer and thus may be omitted. In the case where neither the protective layer (16) nor the low refractive index resin layer (13) is provided, only the light diffusion layer (15) is formed on part of the front surface of the high refractive index layer (11). In this case, the front surface of the high refractive index layer (11) faces an air layer having a low refractive index, and thus light can be trapped in the high refractive index layer (11).

In the fifth embodiment shown in FIG. 9, the low refractive index resin layer (13) as a third refractive index layer may be omitted, and the high refractive index layer (11) may constitute the front surface (1A) of the decorative sheet (10C). In addition, the base layer (17) is an optional layer and thus may be omitted. In addition, the protective layer (16) may be provided on the front surface of the low refractive index resin layer (13).

EXAMPLES

Example 1

Preparation of Ink for Light Diffusion Layer:

In accordance with the composition shown in (A) of the following Table 1, the components were mixed in a mixer to prepare a pigment mother liquor. Next, using the obtained pigment mother liquor, in accordance with the composition shown in (B) of Table 1, the components were mixed in a mixer to prepare an ink for a light diffusion layer.

Formation of Light Diffusion Layer:

As a high refractive index layer, a polycarbonate resin sheet (Technolloy C000 manufactured by Sumika Acryl Co., Ltd., refractive index: 1.585, total light transmission: 90%, sheet thickness: 0.4 mm, shorter side length: 270 mm, longer side length: 530 mm) was used. To one surface of the resin sheet, the ink prepared above was applied using a serial-type inkjet printer. The application was immediately followed by UV irradiation using a UV lamp to cure the ink, thereby forming a light diffusion layer. The thickness of the light diffusion layer was 6 μm. The refractive index of the resin forming the light diffusion layer was 1.459.

Figure 11:
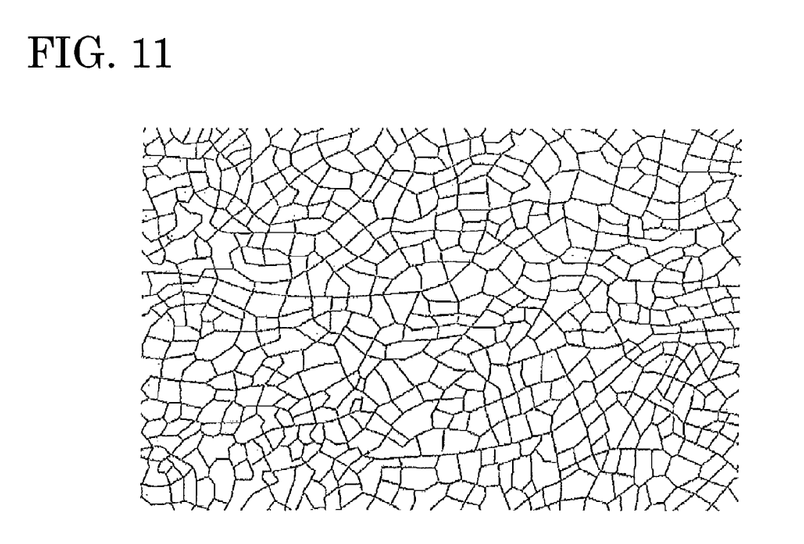
FIG. 11 is a diagram showing an example of the application pattern of a light diffusion layer in the Examples.

The printing conditions were as follows: head heating temperature: 40° C., nozzle diameter: 20 μm, applied voltage: 20 V, pulse width: 15 μs, drive frequency: 1.2 kHz, resolution: 300 dpi, ink application amount: 0.5 g/m². The application pattern was the crazing pattern shown in FIG. 11. In addition, the UV irradiation conditions were as follows: lamp type: metal halide lamp, lamp output: 100 W/cm, irradiation time: 0.5 second, the number of times of irradiation: 4, irradiation distance: 20 mm. At this time, the peak illuminance in UV irradiation at 365 nm was 460 mW/cm², and the integrated light intensity was 800 mJ/cm².

Preparation of Ink for Low Refractive Index Resin Layer:

In accordance with the composition shown in the following Table 2, the components were mixed in a mixer to prepare an ink for a low refractive index resin layer.

TABLE 1

| | Parts by mass |
|---|---|
| (A): Composition of Pigment Mother Liquor | |
| Titanium oxide particles ("PF-671" manufactured by Ishihara Sangyo Kaisha, Ltd.) | 40 |
| Dispersant ("SOLSPERSE36000" manufactured by Lubrizol Japan Limited) | 10 |
| Reactive monomer (Isobornyl acrylate, "IBXA" manufactured by Osaka Organic Chemical Industry Ltd.) | 50 |
| (B): Composition of Ink for Light Diffusion Layer | |
| Pigment mother liquor | 2.5 |
| Reactive oligomer (Dipentaerythritol hexaacrylate, "Light Acrylate DPE-6A" manufactured by Kyoeisha Chemical Co., Ltd.) | 15 |
| Reactive monomer (1,4-Butanediol diacrylate, "SR213" manufactured by Arkema Inc.) | 79 |
| Photopolymerization initiator (1-Hydroxycyclohexyl phenyl ketone, "Irgacure184" manufactured by BASF) | 5 |
| Photopolymerization initiator (Bis(2,4,6-trimethylbenzoyl)phenylphosphine oxide, "Irgacure819" manufactured by BASF) | 3 |
| Reaction inhibitor (4-Hydroxy-2,2,6,6-tetramethylpiperidine 1-oxyl free radical, "4-hydroxy TEMPO" manufactured by HEBEI SMART CHEMICALS Co. Ltd.) | 0.05 |

TABLE 2

| Composition of Ink for Low Refractive Index Resin Layer | Parts by mass |
|---|---|
| Reactive oligomer (Dipentaerythritol hexaacrylate, "Light Acrylate DPE-6A" manufactured by Kyoeisha Chemical Co., Ltd.) | 15 |
| Reactive monomer (Acryloyl morpholine, "ACMO" manufactured by KJ Chemicals Corporation) | 34.25 |
| Reactive monomer (Tetrahydrofurfuryl acrylate, "V#150" manufactured by Osaka Organic Chemical Industry Ltd.) | 38 |
| Photopolymerization initiator (1-Hydroxycyclohexyl phenyl ketone, "Irgacure184" manufactured by BASF) | 5 |
| Photopolymerization initiator (Bis(2,4,6-trimethylbenzoyl)phenylphosphine oxide, "Irgacure819" manufactured by BASF) | 2.5 |
| Reaction inhibitor (4-Hydroxy-2,2,6,6-tetramethylpiperidine 1-oxyl free radical, "4-hydroxy TEMPO" manufactured by HEBEI SMART CHEMICALS Co. Ltd.) | 0.05 |
| Fluorine-based surface conditioner (Oligomer with fluorine-containing group/hydrophilic group/lipophilic group, "F-556" manufactured by DIC Corporation) | 0.2 |

Formation of Low Refractive Index Resin Layer:

To each of the front and back surfaces of the polycarbonate resin sheet having formed thereon a light diffusion layer, the ink for a low refractive index resin layer prepared above was applied using a serial-type inkjet printer. The application was immediately followed by UV irradiation using a UV lamp to cure the ink, thereby forming a low refractive index resin layer. The conditions were the same as the printing conditions and UV irradiation conditions for the formation of a light diffusion layer, except that the printing conditions were such that the ink application amount was 3 g/m$^2$, and the application pattern was a solid pattern (application over the entire surface). The refractive index of the formed low refractive index resin layer was 1.483. In addition, the thickness of the low refractive index resin layer was 15 μm both on the front surface side and the back surface side.

Preparation of Ink for Decorative Layer:

In accordance with the composition shown in (A) of the following Table 3, the components were mixed in a mixer to prepare a pigment mother liquor. Next, using the obtained pigment mother liquor, in accordance with the composition shown in (B) of Table 3, the components were mixed in a mixer to prepare an ink for a decorative layer.

Formation of Decorative Layer:

Using the sheet having formed thereon a light diffusion layer and low refractive index resin layers, the ink for a decorative layer prepared above was printed on the surface opposite to the light diffusion layer using a serial-type inkjet printer to apply a woodgrain-like pattern. The application was followed by UV irradiation using a UV lamp to cure the ink, thereby forming a decorative layer. With respect to the thickness of the decorative layer, the thickness of the thickest part (the height of a projection) was 50 μm.

The printing conditions were as follows: head heating temperature: 57° C., nozzle diameter: 70 μm, applied voltage: 50 V, pulse width: 15 μs, drive frequency: 4.5 kHz, resolution: 720 dpi. The pattern was a woodgrain-like pattern. In addition, the UV irradiation conditions were as follows: lamp type: metal halide lamp, lamp output: 120 W/cm, irradiation time: 1 second, the number of times of irradiation: 20, irradiation distance: 5 mm. The integrated light intensity at this time was 225 mJ/cm$^2$.

Preparation of Ink for Base Layer:

In accordance with the composition shown in the following Table 4, the components were mixed in a mixer to prepare an ink for a base layer.

TABLE 3

| | Parts by mass |
|---|---|
| (A): Composition of Pigment Mother Liquor | |
| Carbon black pigment ("NIPex35" manufactured by Evonik Japan Co., Ltd.) | 15 |
| Dispersant ("SOLSPERSE32000" manufactured by Lubrizol Japan Limited) | 7.5 |
| Reactive monomer (Propoxylated (2) neopentyl glycol diacrylate, "SR9003" manufactured by Arkema Inc.) | 77.5 |
| (B): Composition of Ink for Decorative Layer | |
| Pigment mother liquor | 13 |
| Reactive oligomer (Dipentaerythritol hexaacrylate, "Light Acrylate DPE-6A" manufactured by Kyoeisha Chemical Co., Ltd.) | 10 |
| Reactive monomer (Tetrahydrofurfuryl acrylate, "V#150" manufactured by Osaka Organic Chemical Industry Ltd.) | 25 |
| Reactive monomer (Acryloyl morpholine, "ACMO" manufactured by KJ Chemicals Corporation) | 32 |
| Reactive monomer (2-(1,2-Cyclohexane dicarboximide)ethyl acrylate, "Aronix M-140" manufactured by Toagosei Co., Ltd.) | 10 |
| Photopolymerization initiator (2-Hydroxy-2-methyl-1-phenyl-propane-1-on, "Darocur1173" manufactured by BASF) | 5 |
| Photopolymerization initiator (Bis(2,4,6-trimethylbenzoyl)phenylphosphine oxide, "Irgacure819" manufactured by BASF) | 5 |

TABLE 4

| Composition of Ink for Base Layer | Parts by mass |
|---|---|
| Solvent-based screen ink (Polyester resin, "IPX-HF10203 SR106 Metallic" manufactured by Teikoku Printing Inks Mfg. Co., Ltd.) | 45 |
| Solvent-based screen ink (Polyester resin, "IPX-HF239 Blue Yellow" manufactured by Teikoku Printing Inks Mfg. Co., Ltd.) | 13.6 |
| Solvent-based screen ink (Polyester resin, "IPX-HF179 Red" manufactured by Teikoku Printing Inks Mfg. Co., Ltd.) | 3.7 |
| Solvent-based screen ink (Polyester resin, "IPX-HF399 Indigo" manufactured by Teikoku Printing Inks Mfg. Co., Ltd.) | 0.2 |
| Solvent-based screen ink (Polyester resin, "IPX-HF000 Medium" manufactured by Teikoku Printing Inks Mfg. Co., Ltd.) | 20.8 |
| Diluent solvent ("F-003 Solvent" manufactured by Teikoku Printing Inks Mfg. Co., Ltd.) | 16.7 |
| Curing agent ("200 Curing Agent" manufactured by Teikoku Printing Inks Mfg. Co., Ltd.) | 14.2 |

Formation of Base Layer:

Using the sheet having formed thereon a light diffusion layer, low refractive index resin layers, and a decorative layer, the ink for a base layer prepared above was applied over the entire surface on the side having the light diffusion layer by screen printing from above the low refractive index resin layer. Subsequently, heat drying was performed to cure the ink, thereby forming a base layer. The printing conditions were as follows: the number of meshes: 200, line shape: 48 nm, fabric thickness: 64 nm, bias: 22.5°, squeegee angle: 45°, squeegee speed: 50 mm/s, printing area: 500 mm×250 mm. The drying conditions were as follows: heat drying in an oven, drying temperature: 80° C., drying time: 15 minutes. The above printing and drying were repeated three times to a final dry thickness of 60 nm, thereby forming a base layer.

Preparation of Coating Material for Protective Layer:

In accordance with the composition shown in the following Table 5, the components were mixed in a mixer to prepare a coating material for a protective layer.

TABLE 5

| Composition of Ink for Protective Layer | Parts by mass |
|---|---|
| Reactive oligomer (Dipentaerythritol hexaacrylate, "Light Acrylate DPE-6A" manufactured by Kyoeisha Chemical Co., Ltd.) | 12 |
| Reactive monomer (Acryloyl morpholine, "ACMO" manufactured by KJ Chemicals Corporation) | 40.15 |
| Reactive monomer (Tetrahydrofurfuryl acrylate, "V#150" manufactured by Osaka Organic Chemical Industry Ltd.) | 40 |
| Photopolymerization initiator (1-Hydroxycyclohexyl phenyl ketone, "Irgacure184" manufactured by BASF) | 5 |
| Photopolymerization initiator (Bis(2,4,6-trimethylbenzoyl)phenylphosphine oxide, "Irgacure819" manufactured by BASF) | 2.5 |
| Reaction inhibitor (4-Hydroxy-2,2,6,6-tetramethylpiperidine 1-oxyl free radical, "4-hydroxy TEMPO" manufactured by HEBEI SMART CHEMICALS Co. Ltd.) | 0.05 |
| Fluorine-based surface conditioner (Oligomer with fluorine-containing group/hydrophilic group/lipophilic group/UV reactive group, "RS-75-NS" manufactured by DIC Corporation) | 0.3 |

Formation of Protective Layer:

On the decorative layer side of the sheet after the formation of a base layer, the coating material for a protective layer prepared above was applied to the entire surface to a thickness of 100 nm using a bar coater (trade name "K Control Coater" manufactured by RK Print Coat Instruments Ltd.). Further, UV irradiation was performed using a UV lamp to cure the coating material, thereby forming a protective layer. The coating conditions were as follows: the wire diameter of the bar: 1.27 mm, no space between wires, coating speed: 3.5 m/min. The UV irradiation conditions are the same as the conditions for the formation of a light diffusion layer. The refractive index of the formed protective layer was 1.484.

Die-Cutting:

The sheet having formed thereon a protective layer was die-cut to divide into a part necessary for setting in an injection molding die and an unnecessary part. That is, a mold formed of a Thompson cutting edge was placed on the protective layer side of the sheet, and the sheet was die-cut using a pressing machine (trade name "IOC-20" manufactured by Iino Co., Ltd.). The sheet was formed into a near-oblong shape of 150 mm×400 mm.

Pre-Molding:

The die-cut sheet was shaped using a pressing machine (trade name "DEF-H500" manufactured by Takagi Kiko Co., Ltd.). That is, a sheet pre-heated at 110° C. in advance was set in the pressing machine and pressurized by pressing a die against the sheet with heating at 100° C. The sheet was formed into a semicylindrical shape.

Insert Molding:

The pre-molded sheet was integrated with a resin molded body by insert molding using an injection molding machine (trade name "MD450 S-IV" manufactured by Ube Machinery Corporation, Ltd.). That is, the sheet was set in the injection molding die such that the protective layer side faced the cavity surface, and a synthetic resin was injected into the cavity under the following conditions, then cooled, and cured. The molding conditions were as follows: synthetic resin: PC/ABS resin (trade name "PAX-1439" manufactured by Nippon A&L Inc.), screw internal temperature: 260° C., core temperature: 40° C., cavity temperature: 40° C., pressure at the time of injection: 200 MPa.

Decorative Molded Article:

As above, the decorative molded article according to the first embodiment shown in FIG. 2 was obtained. In order to inject light from the end surface of the obtained decorative molded article, one of the long sides of the decorative molded article, with the sheet end surface thereof being covered with the molding resin, was cut with an NC finishing machine to expose the end surface of the decorative sheet, and an LED was attached to the exposed end surface with a tape. When the LED was turned on, the area having the light diffusion layer partially glowed and emerged from the back of the decorative pattern, resulting in an excellent design that provides a different impression from when the light was off.

Example 2

A decorative molded article of Example 2 was prepared in the same manner as in Example 1, except that the light diffusion layer was applied to the front surface side (i.e., the same side as the decorative layer) of a high refractive index layer (polycarbonate resin sheet). This decorative molded article has the configuration of the third embodiment shown in FIG. 6.

When light was injected into the obtained decorative molded article, the area having the light diffusion layer partially glowed and emerged from the back of the decorative pattern, resulting in an excellent design that provides a different impression from when the light was off. In addition, because the light diffusion layer was present on the front side, the glow was brighter and clearer than in Example 1.

Example 3

A light diffusion layer was formed on the front surface side of a high refractive index layer (polycarbonate resin sheet), and a low refractive index resin layer was formed only on the back surface side. Next, over the low refractive index resin layer on the back surface side, a decorative layer and further a base layer were formed, and then a protective layer was formed over the light diffusion layer on the front surface side. Subsequently, insert molding was performed. In the same manner as in Example 1 in other respects, such as the material forming each layer and the forming conditions (printing conditions, drying conditions, etc.), for example, a decorative molded article of Example 3 was produced. The decorative molded article has the configuration of the fourth embodiment shown in FIG. 8 (however, a base layer (17) was added between the decorative layer (14) and the resin molded body (21)).

When light was injected into the obtained decorative molded article, the area having the light diffusion layer appeared to glow partially in the decorative pattern, providing a different impression from when the light was off. In addition, because the light diffusion layer was applied on the front surface side of the sheet, a three-dimensional design such that light looked like floating was obtained.

Example 4

A light diffusion layer was formed on the back surface side of a high refractive index layer (polycarbonate resin sheet), and a low refractive index resin layer was formed only on the back surface. Next, over the low refractive index resin layer on the back surface side, a decorative layer and further a base layer were formed, and insert molding was performed. On the front surface of the high refractive index layer, neither a protective layer nor a low refractive index resin layer was formed. In the same manner as in Example 1 in other respects, such as the material forming each layer and the forming conditions (printing conditions, drying conditions, etc.), for example, a decorative molded article of Example 4 was produced. The decorative molded article has the configuration of the fifth embodiment shown in FIG. 10 (however, the low refractive index resin layer (13) on the front surface side is omitted).

When light was injected into the obtained decorative molded article, the area having the light diffusion layer appeared to glow partially in the decorative pattern, providing a different impression from when the light was off. In addition, because the outermost surface was flat, a design with a quality appearance was achieved.

Example 5

A decorative molded article of Example 5 was prepared in the same manner as in Example 1, except that the ink for forming a low refractive index resin layer used in Example 1 was changed as follows (the refractive index of the low refractive index resin layer was changed).

Preparation of Ink for Low Refractive Index Resin Layer:

In accordance with the composition shown in the following Table 6, the components were mixed in a mixer to prepare an ink for a low refractive index resin layer of Example 5.

TABLE 6

| Composition of Ink for Low Refractive Index Resin Layer | Parts by mass |
| --- | --- |
| Reactive oligomer (Dipentaerythritol hexaacrylate, "Light Acrylate DPE-6A" manufactured by Kyoeisha Chemical Co., Ltd.) | 12 |
| Reactive monomer (Acryloyl morpholine, "ACMO" manufactured by KJ Chemicals Corporation) | 40.25 |
| Reactive monomer (Ethoxylated (3) bisphenol-A diacrylate, "SR349" manufactured by Arkema Inc.) | 40 |
| Photopolymerization initiator (1-Hydroxycyclohexyl phenyl ketone, "Irgacure184" manufactured by BASF) | 5 |
| Photopolymerization initiator (Bis(2,4,6-trimethylbenzoyl)phenylphosphine oxide, "Irgacure819" manufactured by BASF) | 2.5 |
| Reaction inhibitor (4-Hydroxy-2,2,6,6-tetramethylpiperidine 1-oxyl free radical, "4-hydroxy TEMPO" manufactured by HEBEI SMART CHEMICALS Co. Ltd.) | 0.05 |
| Fluorine-based surface conditioner (Oligomer with fluorine-containing group/hydrophilic group/lipophilic group, "F-556" manufactured by DIC Corporation) | 0.2 |

In Example 5, the refractive index of the formed low refractive index resin layer was 1.521. In addition, as a result of the injection of light into the obtained decorative molded article, the same design as in Example 1 was obtained.

Comparative Example 1

A decorative molded article of Comparative Example 1 was produced in the same manner as in Example 1, except that a low refractive index resin layer was not provided on the front surface side or back surface side of the high refractive index layer (polycarbonate resin sheet). In the obtained decorative molded article, light was absorbed by the base layer and the decorative layer. Thus, light was not transferred, and the light diffusion layer hardly glowed.

Some embodiments have been described above. However, these embodiments are presented by way of example and not intended to limit the scope of the invention. These embodiments can be practiced in other various modes, and various omissions, substitutions, and changes may be made without departing from the gist of the invention. These embodiments and their variations fall within the scope and gist of the invention, and also fall within the scope of the claimed invention and its equivalents.

This application claims the benefit of priority based on Japanese Patent Application No. 2016-060679 filed on Mar. 24, 2016, and the disclosures of which are incorporated herein by reference in their entirety.

INDUSTRIAL APPLICABILITY

The applications of the decorative sheet, the decorative molded article, and the decorative module according to these embodiments are not particularly limited. For example, they can be applied to various vehicle interior parts, including automotive interior materials such as instrument panels and door inner materials of automobiles, housings of various electric products such as electrical appliances and communication devices, and the like.

REFERENCE SIGNS LIST 1, 10A, 10B, 10C: Decorative sheet
2, 20, 20A, 20B, 20C: Decorative molded article
3, 30: Decorative module
11: High refractive index layer (first refractive index layer)
12: Low refractive index resin layer (second refractive index layer)
13: Low refractive index resin layer (third refractive index layer)
14: Decorative layer
15: Light diffusion layer
21: Resin molded body
31: Light source

The invention claimed is:

1. A decorative sheet comprising,
a first refractive index layer having a first refractive index;
a decorative layer;
a second refractive index layer that is a resin layer having a second refractive index lower than the first refractive index and provided between the first refractive index layer and the decorative layer; and
a light diffusion layer that is provided in partial contact with one surface of the first refractive index layer and diffuses light entering from the first refractive index layer so that light is released from part of a front surface of the decorative sheet,
wherein the decorative layer is provided on a back surface side of the first refractive index layer through the second refractive index layer, and the light diffusion layer is provided in partial contact with a front surface of the first refractive index layer.

2. The decorative sheet according to claim 1, wherein the light diffusion layer is a light scattering layer containing particles or a fluorescent layer containing a fluorescent substance.

3. The decorative sheet according to claim 1, wherein the first refractive index layer is made of a resin.

4. The decorative sheet according to claim 1, further comprising a third refractive index layer that is a resin layer having a third refractive index lower than the first refractive index and provided on, of a front and back of the first refractive index layer, a surface opposite to a surface on which the second refractive index layer is provided, and wherein the first refractive index layer is sandwiched between the second refractive index layer and the third refractive index layer.

5. A decorative molded article having a three dimensional shape formed of the decorative sheet according to claim 1.

6. A decorative module comprising the decorative molded article according to claim 5 and a light source capable of injecting light into a side surface of the first refractive index layer.

7. A decorative molded article comprising the decorative sheet according to claim 1 and a resin molded body integrally laminated on a back surface side of the decorative sheet.

8. A decorative module comprising the decorative molded article according to claim 7 and a light source capable of injecting light into a side surface of the first refractive index layer.

9. A decorative sheet comprising,
a first refractive index layer having a first refractive index;
a decorative layer;
a second refractive index layer that is a resin layer having a second refractive index lower than the first refractive index provided between the first refractive index layer and the decorative layer; and
a light diffusion layer that is provided in partial contact with one surface of the first refractive index layer and diffuses light entering from the first refractive index layer so that light is released from part of a front surface of the decorative sheet,
wherein the decorative layer is provided on a back surface side of the first refractive index layer through the second refractive index layer, and the light diffusion layer is provided at an interface between the first refractive index layer and the second refractive index layer.

10. The decorative sheet according to claim 9, wherein the light diffusion layer is a light scattering layer containing particles or a fluorescent layer containing a fluorescent substance.

11. The decorative sheet according to claim 9, wherein the first refractive index layer is made of a resin.

12. The decorative sheet according to claim 9, further comprising a third refractive index layer that is a resin layer having a third refractive index lower than the first refractive index and provided on, of a front and back of the first refractive index layer, a surface opposite to a surface on which the second refractive index layer is provided, and wherein the first refractive index layer is sandwiched between the second refractive index layer and the third refractive index layer.

13. A decorative molded article having a three dimensional shape formed of the decorative sheet according to claim 9.

14. A decorative module comprising the decorative molded article according to claim 13 and a light source capable of injecting light into a side surface of the first refractive index layer.

15. A decorative molded article comprising the decorative sheet according to claim 9 and a resin molded body integrally laminated on a back surface side of the decorative sheet.

16. A decorative module comprising the decorative molded article according to claim 15 and a light source capable of injecting light into a side surface of the first refractive index layer.

* * * * *